United States Patent [19]

Shoji et al.

[11] Patent Number: 4,785,434

[45] Date of Patent: Nov. 15, 1988

[54] SLIP STRUCTURE OF A TIMEPIECE

[75] Inventors: Masaru Shoji, Akishima; Wataru Yamada, Tachikawa; Masayoshi Tanazawa, Musashino; Mitsunobu Yatabe, Komae; Kenichi Nakamura, Fussa; Satoshi Fujio, Akishima; Masaki Yokohama, Fussa; Takashi Watanabe, Tachikawa; Kanenori Ochiai, Kodaira, all of Japan

[73] Assignee: Casio Computer Co., Ltd., Tokyo, Japan

[21] Appl. No.: 121,138

[22] Filed: Nov. 16, 1987

[30] Foreign Application Priority Data

Nov. 19, 1986 [JP] Japan ................................ 61-276230
Mar. 7, 1987 [JP] Japan ............................ 62-32599[U]

[51] Int. Cl.[4] ...................... G04B 17/12; G04B 29/00; F16H 55/17

[52] U.S. Cl. .................................... 368/185; 368/323; 74/434; 464/30

[58] Field of Search .................................... 368/69–70, 368/76, 80, 88, 185–187, 190, 220, 322, 323; 74/434, 436, 460, 462, 504; 464/30, 31, 41–43, 45

[56] References Cited

U.S. PATENT DOCUMENTS

| | | | |
|---|---|---|---|
| 3,930,361 | 1/1976 | Saito et al. | 368/18 S |
| 4,243,329 | 1/1981 | Nakayama | 368/88 |
| 4,636,087 | 1/1987 | Suzuki | 368/185 |

FOREIGN PATENT DOCUMENTS

| | | |
|---|---|---|
| 55-29829 | 7/1980 | Japan . |
| 834844 | 5/1960 | United Kingdom . |
| 1584550 | 2/1981 | United Kingdom . |
| WO86/03213 | 6/1986 | World Int. Prop. O. . |

*Primary Examiner*—Vit W. Miska
*Attorney, Agent, or Firm*—Frishauf, Holtz, Goodman & Woodward

[57] ABSTRACT

Synthetic resin shaft and gear portions are molded to be capable of slipping each other. During a normal timepiece operation, the shaft and gear portions are integrally rotated. During a hand setting operation, the shaft portion is rotated with slip on the gear portion. In this slip structure of a timepiece, at least one of the shaft and gear portions is formed of an oil-containing resin material.

42 Claims, 15 Drawing Sheets

SLIP STRUCTURE OF A TIMEPIECE

BACKGROUND OF THE INVENTION

The present invention relates to a slip structure of a timepiece used for a center wheel or the like of the timepiece.

In an analog timepiece, rotation of a drive source such as a step motor is transmitted to hands such as an hour hand, a minute hand, and the like through a gear train mechanism to move the hands, thereby indicating a time. A center wheel has a slip structure so that a second wheel on which the second hand is fitted and the step motor are not rotated when the positions of the minute and hour hands are adjusted during, e.g., time correction.

More specifically, the center wheel integrally comprises a gear portion and a shaft portion having a canon pinion. During a normal timepiece operation, the gear and shaft portions are integrally rotated to move the minute hand. During adjustment of the positions of the minute and hour hands, e.g., time correction, when a torque larger than a predetermined value is applied to the canon pinion of the shaft portion, only the shaft portion is rotated to rotate the minute and hour hands, while the second wheel and the step motor are not rotated.

In the conventional slip structure described above, the gear and shaft portions of the center wheel are made of a metal, and a pair of leaf spring-like elastic segments are provided to the metal gear portion to extend in parallel in an insertion hole of the gear portion, to which the shaft portion is inserted, so that the canon pinion of the shaft portion is elastically clamped by the pair of elastic segments. For this reason, the number of parts is large, assembly is complicated, and a stable slip torque cannot be obtained resulting in cumbersome machining and high cost.

In order to eliminate these drawbacks, Japanese Utility Model Publication No. 55-29829 discloses that shaft portion 31 and gear portion 32 of a center wheel are formed of a synthetic resin by an injection melding, and are combined to be capable of slipping with each other, as shown in FIG. 1.

In order to prepare the center wheel described above, at first, gear portion 32 is molded. Then, molded gear portion 32 is placed in metal molds for molding shaft portion. Thereafter, a resin is injected into the metal molds to form shaft portion 31. Since shaft portion 31 shrinks upon cooling, gear portion 32 is clamped by extended portions 31*a* of shaft portion 31, thereby combining shaft and gear portions 31 and 32 to be capable of slipping.

With this structure, the slip torque of the center wheel is determined by the clamping force and the frictional resistance of extended portions 31*a*. In order to reduce the slip torque, the clamping force and the frictional resistance need only be reduced. For this purpose, extended portions 31*a* can be reduced in size in the radial direction. However, if extended portions 31*a* are reduced in size, a joint strength between shaft and gear portions 31 and 32 is weakened. As a result, shaft and gear portions 31 and 32 may be disengaged from each other during assembly. Therefore, a decrease in fitting depth is limited, and hence, it is difficult to reduce the slip torque. Therefore, the above-mentioned structure cannot be adopted in the slip structure of a small timepiece such as a wristwatch.

Further, during molding of the shaft portion, the gear portion which has already molded may be distorted due to a temperature of the forming resin for the shaft portion, so that the slip torque may become unstable.

SUMMARY OF THE INVENTION

It is an object of the present invention to provide a slip structure of a timepiece in which shaft and gear portions are molded of synthetic resin and combined to be capable of slipping, wherein a slip torque can be reduced and stabilized.

In order to achieve the above object, in the slip structure of the timepiece according to the present invention, shaft and gear portions are molded of synthetic resin and combined to be capable of slipping, and at least one of the shaft and gear portions is formed of an oil-containing resin material.

In this manner, when the shaft portion is rotated with slip relative to gear portion, a thin oil film is formed at contact surfaces thereof, and the oil film serves as a lubricant, thus reducing and stabilizing the slip torque.

DESCRIPTION OF THE PREFERRED EMBODIMENTS

Figure 1:
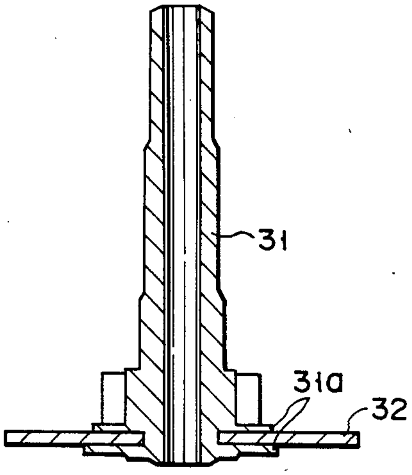
FIG. 1 is a sectional view of a center wheel of a conventional analog wristwatch.
Figure 2:
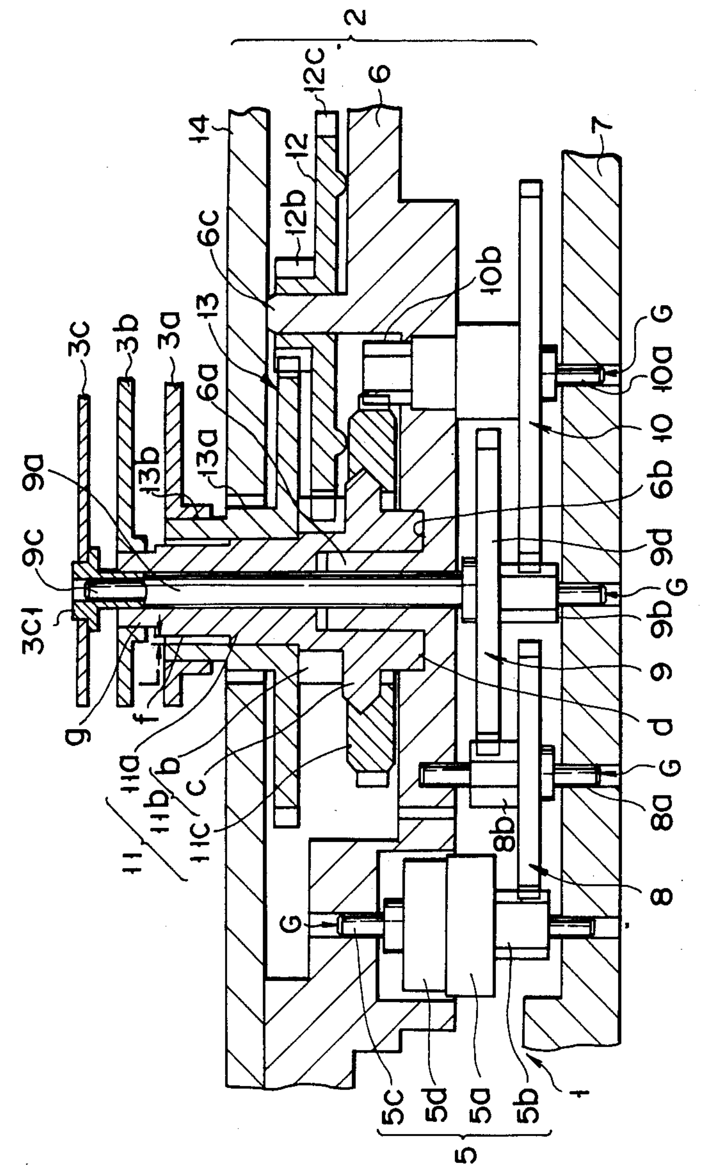
FIG. 2 is a longitudinal sectional view of an analog wristwatch comprising a slip structure of a timepiece according to the present invention.
Figure 3:
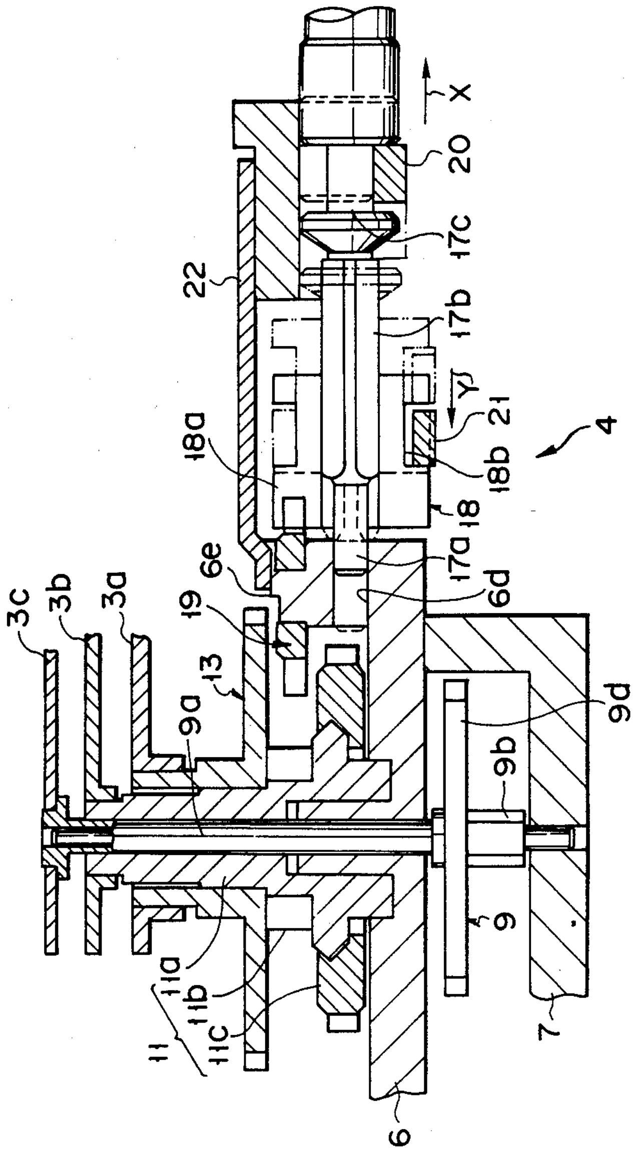
FIG. 3 is a longitudinal sectional view taken along another portion of the analog wristwatch in FIG. 2.

FIGS. 2 to 10 show a first embodiment of the present invention. FIGS. 2 and 3 show an analog movement of an electronic wristwatch. The analog movement transmits the rotation of rotor 5 of step motor 1 to gear train mechanism 2, and mechanism 2 moves hands such as hour hand 3a, minute hand 3b, and second hand 3c to indicate a time. Time setting mechanism 4 adjusts positions of the hands.

Step motor 1 is a drive source for moving the hands, and comprises rotor 5, a stator, a coil (neither are shown), and etc. Each time an inversion pulse having a predetermined period is applied to the coil, rotor 5 is rotated through 180°. In this case, rotor 5 is constituted by rotor portion 5a, rotor pinion 5b, rotor shaft 5c, and etc., as shown in FIG. 2, and these components are integrally formed of a potassium titanate whisker-containing polyacetal resin. Magnet ring 5d is attached to rotor portion 5a. Rotor shaft 5c is rotatably mounted between main plate 6 and bearing plate 7. Note that resin injection gate G of rotor 5 is located at the center of the upper end face of rotor shaft 5c.

Gear train mechanism 2 transmits the rotation of rotor 5 of step motor 1 to move the hands, and is constituted by fifth wheel 8, second wheel 9, third wheel 10, center wheel 11, intermediate wheel 12, hour wheel 13, and etc. Fifth, second, and third wheels 8, 9, and 10 are mounted between main plate 6 and bearing plate 7, and center, intermediate, and hour wheels 11, 12, and 13 are mounted on main plate 6. In this case, main plate 6 and bearing plate 7 are formed of glass fiber-containing polyphenylene sulfide resin (PPS resin) or a glass fiber-containing polyetherimide resin, and dial 14 is provided on the upper portion of main plate 6.

The wheels will be sequentially described below.

Fifth wheel 8 is rotated in meshing with rotor pinion 5b of step motor 1, and is formed of a potassium titanate whisker-containing polyacetal resin. Fifth wheel 8 is molded integrally with shaft portion 8a and fifth wheel pinion 8b. Resin injection gate G of wheel 8 is located at the center of the lower end face of shaft portion 8a.

Figure 7:
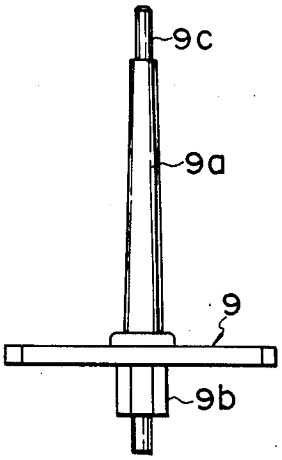
FIG. 7 is a front view of a second wheel of the analog wristwatch shown in FIG. 2.
Figure 8:
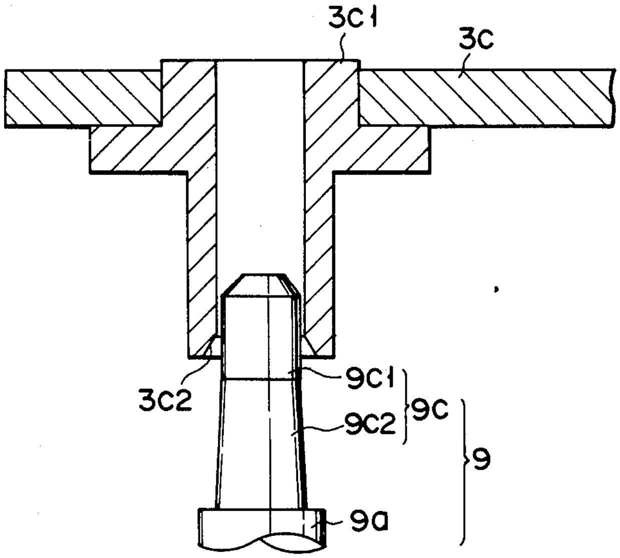
FIG. 8 is a view showing a state wherein a second hand is attached to the second wheel shown in FIG. 7.
Figure 9A:
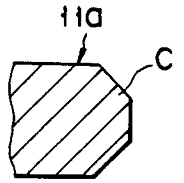
FIGS. 9(A) to 9(J) and FIG. 10 are views showing modifications of the center wheel according to a first embodiment of the present invention.
Figure 9B:
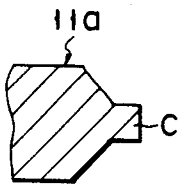
Figure 9C:
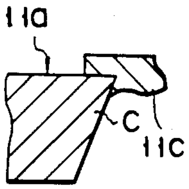
Figure 9D:
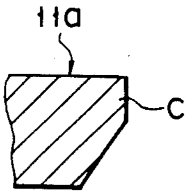
Figure 9E:
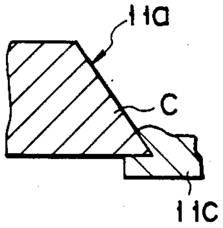
Figure 9F:
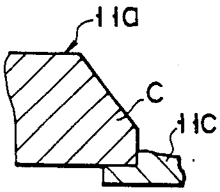
Figure 9G:
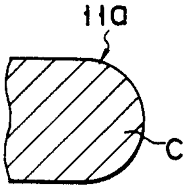
Figure 9H:
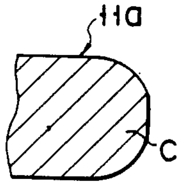
Figure 9I:
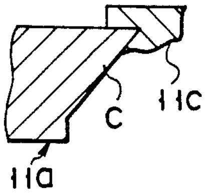
Figure 9J:
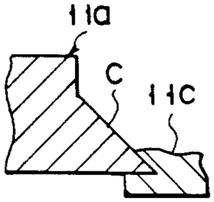

Second wheel 9 is rotated in meshing with fifth wheel pinion 8b of fifth wheel 8 to move second hand 3c. Shaft portion 9a of wheel 9 serves as a second hand shaft for second hand 3c, and projects upward through bearing portion 6a of main plate 6 and dial 14. Second hand 3c is attached to the projecting end of shaft portion 9a. Second wheel 9 is formed of a potassium titanate whisker-containing liquid crystal polymer resin or polyetherimide resin, and is formed integrally with shaft portion 9a, second wheel pinion 9b, and second wheel gear 9d, as shown in FIG. 7. Resin injection gate G of wheel 9 is located at the center of the lower end face of shaft portion 9a. In this case, a portion of shaft portion 9a, which projects above bearing portion 6a of main plate 6, is formed into a straight columnar shape, and hand mount 9c having a smaller diameter than that of shaft portion 9a is provided on the upper end of portion 9a, as shown in FIG. 8. More specifically, hand mount 9c is a portion to which mounting metal member 3c1 of second hand 3c is fitted, and has upper columnar guide portion 9c1 and lower tapered portion 9c2. Second hand 3c is formed of a metal, and has mounting metal member 3c1 at one end thereof. Mounting metal member 3c1 has a cylindrical shape. Chamfered surface (guide surface) 3c2 for guiding hand mount 9c of shaft portion 9a is formed at the lower end of the inner surface of member 3c1. Therefore, upon mounting of second hand 3c, when mounting metal member 3c1 is fitted on hand mount 9c, member 3c1 can be smoothly fitted on guide portion 9c1 of hand mount 9c by chamfered surface 3c2, and when member 3c1 is further pressed, it is tightly fitted on tapered portion 9c2 of hand mount 9c. In this manner, second hand 3c is mounted on shaft portion 9a of second wheel 9. Bearing portion 6a of main plate 6 through which shaft portion 9a extends has a sufficiently large height so as to prevent shaft portion 9a of wheel 9 from fluctuating the center thereof.

Third wheel 10 is rotated in meshing with second wheel pinion 9b of second wheel 9, and is formed of a potassium titanate whisker-containing polyacetal resin. As shown in FIG. 2, wheel 10 is formed integrally with shaft portion 10a and third wheel pinion 10b. In this case, third wheel pinion 10b extends through main plate 6 and projects thereabove. Resin injection gate G is located at the center of the lower end face of shaft portion 10a.

Center wheel 11 is rotated in meshing with third wheel pinion 10b of third wheel 10 so as to move minute hand 3b. Shaft portion 11a serves as a minute hand shaft for minute hand 3b, and is rotatably mounted on the outer surface of bearing portion 6a of main plate 6. The upper end of shaft portion 11a extends through dial 14 and projects thereabove. Minute hand 3b is fitted on the projecting portion of shaft portion 11a. Center wheel 11 is formed by two-color molding with shaft portion 11a having canon pinion portion 11b, and gear portion 11c, gear portion 11c being rotatable with slip over canon pinion portion 11b. Shaft portion 11a is formed of a potassium titanate whisker-containing PPS resin having high wear resistance and mechanical strength, and a higher melting temperature than that of the synthetic resin forming gear portion 11c. Gear portion 11c is formed of a potassium titanate whisker-containing 12 nylon resin (polyamide resin) having a small degree of shrinkage, and a lower melting temperature than that of the synthetic resin forming shaft portion 11a.

Figure 4:
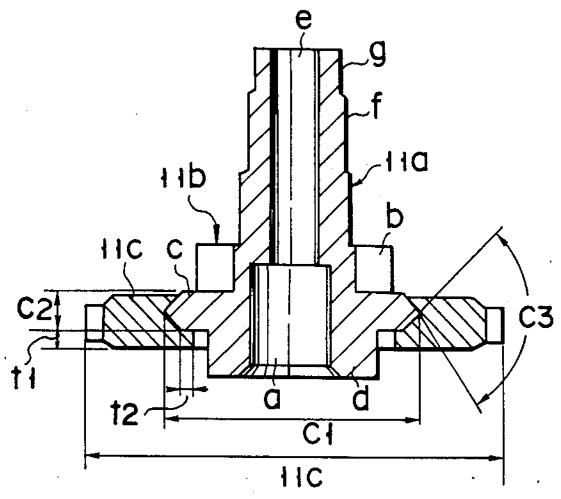
FIG. 4 is a sectional view of a center wheel of analog wristwatch in FIG. 2.

Center wheel 11 is constituted as shown in FIG. 4. More specifically, shaft portion 11a has a cylindrical shape, and canon pinion portion 11b is formed in the lower portion of shaft portion 11a. The interior of canon pinion portion 11b has a large-diameter hole a, and pinion b, projecting portion c, and extending portion d are formed on the peripheral surface of portion 11b. The interior of the upper portion of shaft portion 11a has a small-diameter portion e, and relief portion f and hand mount g are formed on the peripheral surface of portion 11a. Canon pinion portion 11b is so designed that large-diameter portion a is rotatably fitted on bearing portion 6a of main plate 6. Extending portion d of the lower end of shaft portion 11a extends downward, and is rotatably inserted in annular groove 6b formed around bearing portion 6a of main plate 6. Thus, bearing portion 11a can be satisfactorily held to be prevented from fluctuating the center thereof. Pinion b formed on the outer surface of shaft portion 11a is meshed with gear 12c of intermediate wheel 12. Pinion b has involute teeth. Projecting portion c is formed into a collar shape below pinion b, and gear portion 11c is molded thereon. The outer peripheral portion of projecting portion c has converged shape toward the radially distal end. In this case, outer diameter c1 of the radially distal end of projecting portion c is about 2.1 mm, thickness c2 of the collar-shaped portion is about 0.3 mm, and angle c3 of the radially distal end is about 120°. Gear portion 11c molded on projecting portion c has an outer diameter of about 3.4 mm, distance t1 projected downward from projecting portion c is about 0.15 mm, and thickness t2 over which the collor-shaped outer peripheral portion of projecting portion c is intruded into gear portion 11c is about 0.1 mm. Thus, center wheel 11 has an appropriate slip torque (3 to 6 g·cm). When a torque (load) exceeding the above slip torque is applied, canon pinion portion 11b (shaft portion 11a) slips on gear portion 11c. Shaft portion 9a of second wheel 9 is inserted into small-diameter hole e in the upper portion of shaft portion 11a. Furthermore, relief portion f formed on the outer surface of shaft portion 11a has a smaller diameter than that of shaft portion 11a, and faces hand mount 13b of hour wheel 13 (to be described later) with predetermined clearance L, so that even if hand mount 13b is deformed upon fitting of hour hand 3a thereon, hand mount 13b is not in contact with shaft portion 11a of center wheel 11. Note that minute hand 3b is fitted on hand mounting portion g of shaft portion 11a.

Figure 5A:
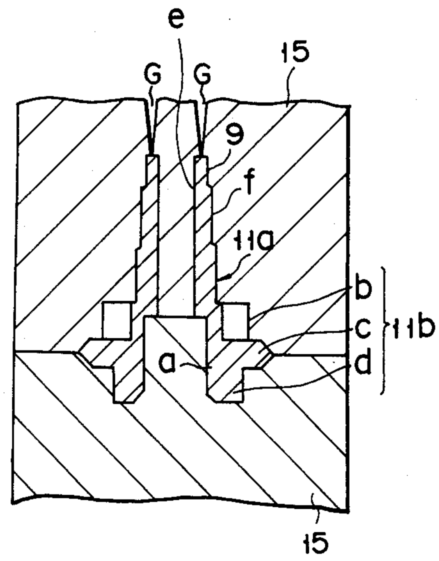
FIGS. 5(A) and 5(B) are views showing a method of manufacturing the center wheel shown in FIG. 4.
Figure 5B:
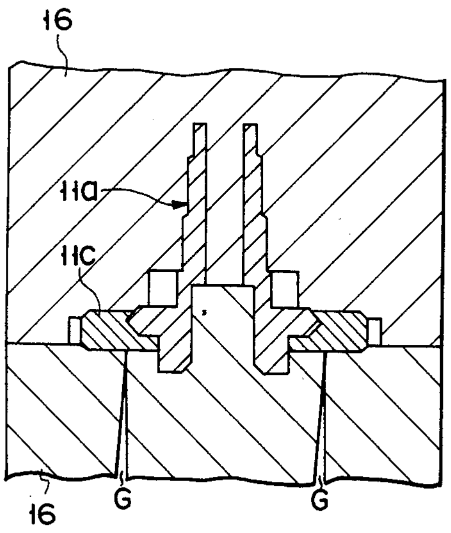
Figure 6:
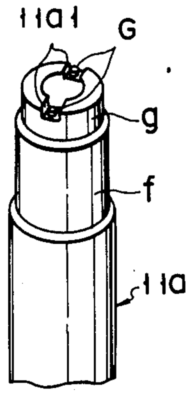
FIG. 6 is a perspective view showing a distal end portion of the center wheel shown in FIG. 4.

When center wheel 11 described above is to be molded, metal molds 15 and 16 shown in FIGS. 5(A) and 5(B) are used. Metal molds 15 and 16 are assembled in a turntable type automatic insertion molding machine. At first, as shown in FIG. 5(A), shaft portion 11a having canon pinion portion 11b is injection-molded in a pair of upper and lower primary metal molds 15. Resin pellets used in this case are a crystalline potassium titanate whisker-containing PPS resin or polyetherimide resin in which several % of a silicone-based oil having a heat-resistance of 250° C. or higher are mixed. Resin injection gates G are located in two recesses 11a and 11a2 formed in the upper end face of shaft portion 11a, as shown in FIG. 6. Shaft portion 11a molded in this manner is removed from primary metal molds 15, and is then placed in a pair of upper and lower secondary metal molds 16 shown in FIG. 5(B). A secondary molding resin is injected from resin injection gates G formed in lower metal mold 16, thereby molding gear portion 11c on shaft portion 11a as a primary molded production. Resin pellets used in this case are a crystalline potassium titanate whisker-containing 12 nylon resin (polyamide resin) in which several % of a silicone-based oil having a heat-resistance of 250° C. or higher. The center wheel 11 formed in the above described manner is then dipped in a mineral oil or silicone oil having a dimethyl siloxane structure at a high temperature of about 100° C. for about 3 hours to be subjected to annealing. In this case, the temperature of the oil can be about 80% of a thermal deformation temperature, and the annealing time can be an hour or longer. In this manner, center wheel 11 shown in FIG. 4 can be obtained.

Intermediate wheel 12 is rotated in meshing with pinion b formed on canon pinion portion 11b of center wheel 11, and is formed of a potassium titanate whisker-containing polyacetal resin. Intermediate wheel 12 is formed integrally with intermediate wheel pinion 12b, and is rotatably mounted on shaft portion 6c projecting from the upper surface of main plate 6. In this case since gear 12c of intermediate wheel 12 meshes with pinion b of center wheel 11, the shape of each teeth of gear 12c is the same involute as that of pinion b.

Hour wheel 13 is rotated in meshed with pinion 12b of intermediate wheel 12 to move hour hand 3a, and is formed of a potassium titanate whisker-containing polyacetal resin. Shaft portion 13a of hour wheel 13 has a cylindrical shape, and is rotatably fitted on the outer surface of shaft portion 11a of center wheel 11. The upper end of shaft portion 13a projects above dial 14, and the projecting portion serves as hand mount 13b. Hour hand 3b is fixed by press-fitting on hand mount 13b.

Note that other gears in gear train mechanism 2 have cycloid teeth except for pinion b of center wheel 11 and gear 12c of intermediate wheel 12.

Time setting mechanism 4 for setting the positions of the hands has winding stem 17, sliding pinion 18, setting wheel 19, setting lever 20, yoke 21, and etc., as shown in FIG. 2, and is provided on main plate 6.

More specifically, winding stem 17 is slidably and rotatably mounted on main plate 6, and is slid or rotated upon operation of a crown (not shown) extending outside a wristwatch case. Winding stem 17 is formed of a metal. Guide portion 17a is provided at the inner distal end of stem 17, spline portion 17b is provided on the right side of guide portion 17a, and stepped recess portion 17c is provided on the right side of spline portion 17b. Guide portion 17a is slidably and rotatably inserted in guide hole 6d of main plate 6. Spline portion 17b is a portion on which sliding pinion 18 is slidably mounted, and a plurality of spline grooves are formed on its outer surface. Setting lever 20 is arranged on stepped recess 17c, so that a withdrawal position of winding stem 17 is regulated by setting lever 20.

Sliding pinion 18 is meshed with setting wheel 19 in response to the pull-out operation of winding stem 17, and is rotated upon rotation of winding stem 17. Sliding pinion 18 is formed of a carbon fiber-containing PPS resin, and has a substantially cylindrical shape. Crown gear 18a is arranged at the left end face of pinion 18, and recessed groove portion 18b is formed on its outer surface. In this case, crown gear 18a has seven teeth each of which has involute shape. Yoke 21 is arranged in groove portion 18b, so that sliding pinion 18 is slid by yoke 21 in response to the pull-out operation of winding stem 17.

Setting wheel 19 transmits the rotation of sliding pinion 18 to intermediate wheel 12 in gear train mechanism 2 described above, and is formed of a polyacetal resin having a smaller hardness than that of the synthetic resin forming sliding pinion 18 and intermediate wheel 12. Setting wheel 19 is rotatably mounted on shaft portion 6e projecting from the upper surface of main plate 6, and is pressed by metal press plate 22 mounted on the upper portion of main plate 6. In this case, since setting wheel 19 is meshed with sliding pinion 18 and intermediate wheel 12, it has involute teeth. The number of teeth of wheel 19 is 8, the diameter of a pitch circle is 1,360 μm, and a module is 170 μm.

Gear 12c of intermediate wheel 12 meshed with setting wheel 19 has 20 teeth, a diameter of a pitch circle of 3,400 μm, and a module of 170 μm. Pinion b of center wheel 11 meshed with gear 12c of intermediate wheel 12 has eight teeth, a diameter of a pitch circle of 1,360 μm, and a module of 170 μm.

The operation of the analog movement arranged as described above will be described hereinafter.

Normally, the hands are moved by step motor 1 to indicate a time. More specifically, as shown in FIG. 2, when rotor 5 of step motor 1 is rotated, the rotation of it is transmitted to second wheel 9 through fifth wheel 8 to rotate second wheel 9, thereby moving second hand 3*c* fitted on the upper end of shaft portion 9*a* of second wheel 9. When second wheel 9 is rotated in this manner, the rotation of it is transmitted to center wheel 11 through third wheel 10, thus rotating center wheel 11. In this case, center wheel 11 is so designed that shaft and gear portions 11*a* and 11*c* are combined to be rotatable with slip each other. However, in this state, since no load exceeding a predetermined value is applied to center wheel 11, shaft and gear portions 11*a* and 11*c* are integrally rotated. For this reason, minute hand 3*b* fitted on shaft portion 11*a* of center wheel 11 is moved. When center wheel 11 is moved in this manner, its rotation is transmitted to hour wheel 13 through intermediate wheel 12 to rotate hour wheel 13, thereby moving hour hand 3*a*. In this manner, hour, minute, and second hands 3*a*, 3*b*, and 3*c* are rotated above dial 14, thus indicating a time.

When a time is to be set, winding stem 17 of time setting mechanism 4 shown in FIG. 3 is pulled out, and is rotated through a predetermined angle. More specifically, when winding stem 17 is pulled in a direction indicated by arrow X, setting lever 20 arranged in stepped recess portion 17*c* of winding stem 17 is moved together with winding stem 17 to set winding stem 17 at a predetermined position. Upon movement of setting lever 20, yoke 21 is moved in a direction indicated by arrow Y to cause sliding pinion 18 to be moved in the same direction along spline portion 17*b* of winding stem 17, thereby meshing crown gear 18*a* of sliding pinion 18 with setting wheel 19. When winding stem 17 is rotated in this state, its rotation is transmitted to setting wheel 19 through sliding pinion 18, and the rotation of setting wheel 19 is transmitted to center and hour wheels 11 and 13 through intermediate wheel 12. Thus, center and hour wheels 11 and 13 are rotated to rotate hour and minute hands 3*a* and 3*b* to adjust their positions. In this case, a torque (rotational force) is applied from winding stem 17 to center wheel 11. When this torque exceeds the slip torque (3 to 6 g·cm) of center wheel 11, shaft portion 11*a* slips on gear portion 11*c*, and shaft portion 11*a* is rotated with slip on gear portion 11*c*. In addition, when shaft portion 11*a* is rotated with slip, a thin film of a silicone-based oil is formed on the contact surfaces of shaft and gear portions 11*a* and 11*c*. Therefore, the thin film serves as a lubricant, and shaft portion 11*a* can be smoothly rotated with a stable slip torque on gear portion 11*c*. For this reason, the positions of the minute and hour hands can be adjusted without rotating second wheel 9 for the second hand 3*c* and rotor 5 of step motor 1.

With the slip structure of the analog movement described above, since shaft portion 11*a* of center wheel 11 to which minute hand 3*b* is fitted and gear portion 11*c* are combined to be slip-rotatable each other, the hands 3*a*, 3*b*, and 3*c* are normally moved by the rotation of rotor 5 of step motor 1, and a time can be accurately indicated. When the hands are set, e.g., during time setting, shaft portion 11*a* is slipped on gear portion 11*c*, thus allowing setting of positions of the hands. In particular, since projecting portion c which is converged toward its distal end is formed on shaft portion 11*a* of center wheel 11 and gear portion 11*c* is molded on projecting portion c, a stable slip torque can be obtained by such a simple structure, and gear portion 11*c* can be firmly mounted on shaft portion 11*a*. In this case, since shaft portion 11*a* is formed of a potassium titanate whisker-containing PPS resin having high wear-resistance and mechanical strength and a higher melting temperature than that of the synthetic resin forming gear portion 11*c* and gear portion 11*c* is formed of a potassium titanate whisker-containing 12 nylon resin (polyamide resin) having a small degree of shrinkage and a lower melting temperature than that of the synthetic resin forming shaft portion 11*a*, an appropriate slip torque of about 3 to 6 g·cm can be obtained. If these materials are changed, a slip torque of 2 to 10 g·cm may be obtained. Further, since shaft and gear portions 11*a* and 11*c* of center wheel 11 are molded from resin pellets in which several % of a silicone-based oil having a heat-resistance of 250° C. or higher is mixed, a thin film of the silicone-based oil serving as a lubricant is formed between the contact surfaces of shaft and gear portions 11*a* and 11*c*, when a predetermined torque or more is applied to slip-rotatable shaft and gear portions 11*a* and 11*c*. Thus, shaft portion 11*a* can be smoothly rotated on gear portion 11*c*. Furthermore, after molding, the molded product, that is center wheel 11, is dipped in mineral oil at a high temperature of about 100° C. for 3 hours to be annealed. Therefore, internal stress in the molded resin can be uniformly distributed, and water absorption properties of the resin can be reduced, so that a change in dimensions of the molded product due to the water absorption can be prevented. In this manner, a molded product with high precision can be obtained. Shaft and gear portions 11*a* and 11*c* of center wheel 11 can be automatically molded by the two-color molding in a turntable type molding apparatus, resulting in high productivity and easy manufacture. In the molding of shaft portion 11*a*, since resin injection gates G are located in two recess portions 11*a*1 formed on the upper end face of shaft portion 11*a*, a resin can be uniformly injected, and shaft portion 11*a* can be precisely molded. In addition, extending portion d is formed on the lower end of shaft portion 11*a* of center wheel 11, and is rotatably inserted in annular groove 6*b* formed in circumference of the outer surface of bearing portion 6*a* of main plate 6. Thus, when main plate 6 is formed of a synthetic resin, even if its thickness is increased in order to obtain a sufficient mechanical strength, the total thickness of the analog movement is not increased, center wheel 11 can be satisfactorily held by bearing portion 6*b*, and center wheel 11 can be prevented from fluctuating the center thereof. Furthermore, relief portion f is formed on the outer surface of shaft portion 11*a* of center wheel 11 to face hand mount 13*b* of hour wheel 13. Therefore, even if shaft portion 13*a* of hour wheel 13 is deformed when hour hand 3*a* is fitted on hand mount 13*b*, shaft portion 13*b* does not contact shaft portion 11*a* of center wheel 11 so that center and hour wheels 11 and 13 can be smoothly rotated.

In the wheels used in gear train mechanism 2 of the analog movement described above, each of rotor 5, fifth, second, and third wheels 8, 9, and 10 arranged between main plate 6 and bearing plate 7 is uniformly filled with synthetic resin at molding time so that the size thereof becomes accurate because resin filling gates G are located at the centers of the end faces of shaft portions 5*a*, 8*a*, 9*a*, and 10*a*. In particular, since second wheel 9 is molded of a potassium titanate whisker-containing liquid crystal polymer resin which is injected through resin injection gate G located at the center of the lower end face of shaft portion 9*a*, in shaft portion 9*a* of second wheel 9, the resin flows along the longitudinal axis of shaft portion 9*a*, and the liquid crystal polymer resin is oriented its extended molecular chain structure in the resin flowing direction, i.e., in the axial direction. In addition, potassium titanate whiskers contained in the liquid crystal polymer are very small, i.e., have a fibrous diameter of 0.2 to 0.5 μm, and a length of 10 to 20 μm. Therefore, since the longitudinal axes of the whiskers are oriented in the resin flowing direction, and the mechanical strength in the axial direction of shaft portion 9*a* is increased. For this reason, when second hand 3*c* is fitted on the upper end of shaft portion 9*a* of second wheel 9, shaft portion 9*a* may not be bent or damaged, and second hand 3*c* can be fixed very securely and rigidly. In this case, since shaft portion 9*a* of second wheel 9 has a simple straight columnar shape, its molding can be facilitated. Since hand mount 9*c* formed on the upper end of shaft portion 9*a* consists of guide portion 9*c*1 and tapered portion 9*c*2, mounting metal member 3*c*1 of second hand 3*c* is smoothly guided by guide portion 9*c*1 when mounting metal member 3*c*1 of second hand 3*c* is fitted on hand mount 9*c*, and, it is firmly fitted on tapered portion 9*c*2 when member 3*c*1 is further pressed. For this reason, the mounting operation of mounting metal member 3*c*1 can be much facilitated. In addition, since chamfered surface 3*c*2 is formed on the lower end of the inner surface of mounting metal member 3*c*1 of second hand 3*c*, mounting metal member 3*c*1 can be smoothly press-fitted on hand mount 9*c* of shaft port 9*a* without calking mounting metal member 3*c*1 on the outer peripheral surface of shaft portion 9*a* of second wheel 9.

In time setting mechanism 4 of the analog movement described above, in which sliding pinion 18, setting wheel 19, and intermediate wheel 12 transmit the rotation of winding stem 17 to center and hour wheels 11 and 13, sliding pinion 18 is molded from a carbon fiber-containing PPS resin, minute wheel 12 is formed of a potassium titanate whisker-containing polyacetal resin, and setting wheel 19 therebetween is formed of a polyacetal resin softer than the synthetic resin forming of pinion 18 and wheel 12. Therefore, since a stress acting on sliding pinion 18 and intermediate wheel 12 during the time setting can be absorbed by setting wheel 19, the rotation of winding stem 17 can be satisfactorily transmitted without deforming or damaging the teeth of the wheels. In addition, since pinion 18, wheel 19, gear 12*c* of wheel 12, and pinion b of center wheel 11 have involute teeth, these members formed of the above-mentioned resins can have a sufficient mechanical strength.

Note that dimensions of a portion at which shaft and gear portions 11*a* and 11*c* of center wheel 11 are jointed are not limited to those described in the above embodiment. For example, outer diameter c1 of the distal end of projecting portion c may be set to be about 1.5 mm to 2.5 mm, thickness c2 of the collar-shaped portion may be set to be about 0.15 mm to 0.4 mm, and angle c3 of the distal end may be set to fall within the range of about 90° to 150°.

Distance t1 projected downward from projecting portion c and thickness t2 over which the collar-shaped outer peripheral portion of projecting portion c is intruded into gear portion 11*c* need only be 0 mm or more to obtain an appropriate slip torque.

The shape of projecting portion c of shaft portion 11*a* of center wheel 11 is not limited to that described in the above embodiment. For example, projecting portion c may be formed into shapes shown in FIGS. 9(A) to 9(J), and may have any shape if it is converged toward the radially outer or inner end.

Figure 10:
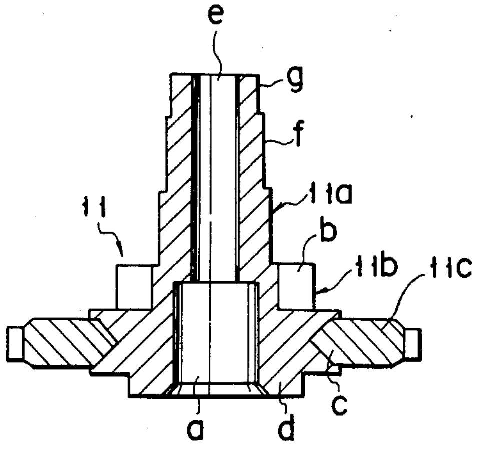

In the above embodiment, projecting portion c is formed on shaft portion 11*a* of center wheel 11. The present invention is not limited to this. For example, as shown in FIG. 10, projecting portion c which is converged toward the radially inner end may be formed on the inner surface of gear portion 11*c*. In this case, the dimensions of projecting portion c are substantially the same as those in the above embodiment, and shaft and gear portions 11*a* and 11*c* can have a constant slip torque and can be slip-rotated in the same manner as in the above embodiment.

In the above embodiment, when center wheel 11 is formed, at first, shaft portion 11*a* is molded, and, then, gear portion 11*c* is molded. However, contrary to this, gear portion 11*c* may be molded at first, and shaft portion 11*a* may be molded. In this case, melting temperature of a resin material of gear portion 11*c*, as the primary molded production, must be higher than that of a resin material of shaft portion 11*a* as the secondary molded production.

In the above embodiment, when center wheel 11 is formed, molding is performed by using resin pellets in which several % of a silicone-based oil having a heat-resistance of 250° C. or higher is mixed, and the molded production is dipped in mineral oil at a high temperature of about 100° C. for about 3 hours to be annealed. However, the present invention is not limited to this. When several % of a silicone-based oil are mixed in the resin pellets, the molded product need not always be annealed. Contrary to this, when annealing is performed, several % of a silicone-based oil need not always be mixed in the resin pellets. Either of the above methods can be employed. If the molded production is oil-annealed, a thin oil film serving as a lubricant can be formed on the contact surfaces of shaft and gear portions 11*a* and 11*c* when shaft portion 11*a* is slip-rotated on gear portion 11*b*. Thus, the slip torque can be reduced and stabilized.

A second embodiment of the present invention will be described with reference to FIGS. 11 to 15.

In this embodiment, a shaft portion has such shape that a mold register surface of molds for the shaft portion is located at one of the upper and lower surfaces of a joint portion of the shaft portion, on the joint portion being mounted with a gear portion. Thus, eccentricity of the joint portion of the shaft portion caused by misregistration of metal molds during molding operation for the shaft portion can be prevented, and the shaft portion has very good rotation characteristics to provide an appropriate stable slip torque.

Figure 11:
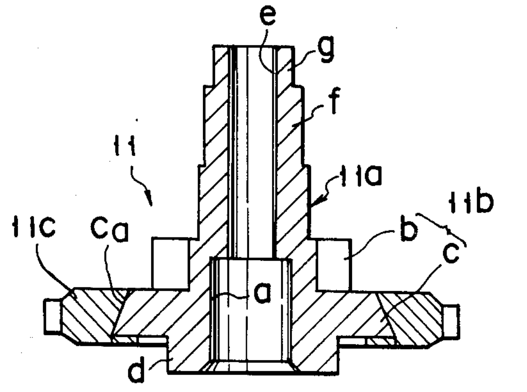
FIG. 11 is a longitudinal sectional view of a center wheel comprising a slip structure according to a second embodiment of the present invention.
Figure 12A:
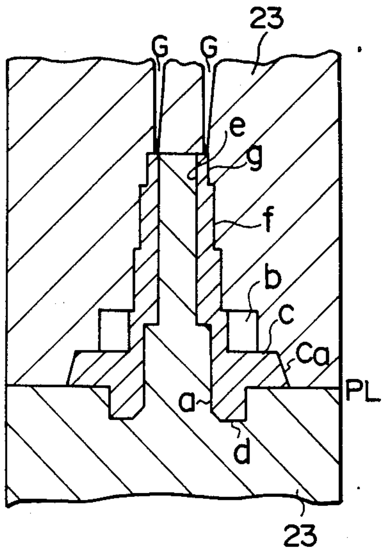
FIGS. 12(A) and 12(B) are views showing a method of manufacturing the center wheel according to the second embodiment shown in FIG. 11.
Figure 12B:
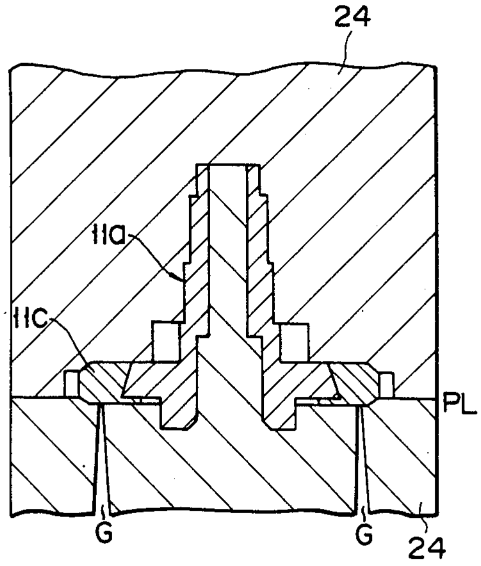

More specifically, as shown in FIG. 11, projecting portion c of shaft portion 11*a* is formed to have downwardly inclined outer peripheral surface Ca. In metal molds 23, 23 for molding shaft portion 11*a*, parting line PL, i.e., a joint surface of the upper and lower metal molds, is located at the lower surface of projecting portion c of shaft portion 11*a*. If metal molds 23, 23 are misregistered during molding operation for shaft portion 11*a*, shaft portion 11*a* can be satisfactorily molded without the center of the radially distal end of projecting portion c of shaft portion 11*a* being eccentric, and an appropriate, stable slip torque can be obtained. For example, assume that projecting portion c of shaft portion 11$a$ has a V shape, and a mold register surface of molds 15 is located a the radially distal end of projection c, as in the above embodiment. Then, the upper region of projecting portion c, which is located above the distal end, and the lower region of projecting portion c, which is located below the distal end, cannot be concentric with each other due to a slight misregistration of upper and lower metal molds 15. Furthermore, the slip torque between shaft and gear portions 11$a$ and 11$c$ is increased. Thus, an appropriate, stable slip torque cannot be obtained.

However with center wheel 11 of the second embodiment, the outer peripheral surface of projecting portion c of shaft portion 11$a$ is formed to have downwardly inclined surface Ca, and a mold register surface is located at the lower surface of the projecting portion c. Even if metal molds 23, 23 are misregistered, shaft portion 11$a$ can be satisfactorily molded. Therefore, upper and lower metal molds 23, 23 can be very easily registered. For this reason, metal molds 23, 23 can be easily manufactured at relatively low cost.

Figure 13A:
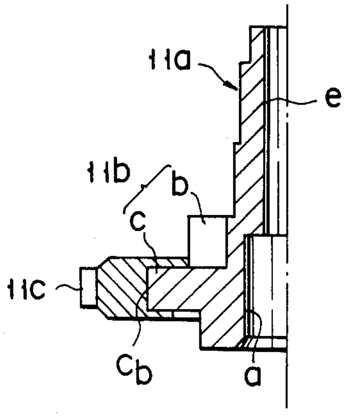
FIGS. 13(A) to 13(D) are views showing modifications of the center wheel in the second embodiment.
Figure 13B:
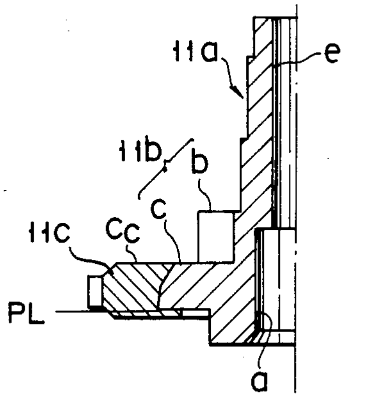
Figure 13C:
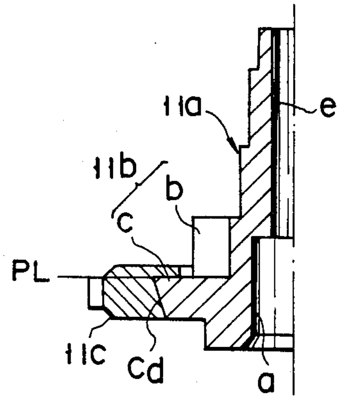
Figure 13D:
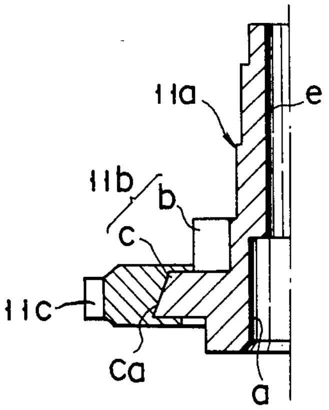

Note that in the above embodiment, the outer peripheral surface of projecting portion c of shaft portion 11$a$ is formed to have downwardly inclined surface Ca. However, the present invention is not limited to this. For example, the outer peripheral surface of projecting portion c may be generally vertical surface Cb having a small gradient for removing the shaft portion 11$a$ from molds 23, 23, as shown in FIG. 13(A), or may be double inclined surface Cc which consist of two inclined area having different inclination angles each other, as shown in FIG. 13(B). Furthermore, as shown in FIG. 13(C), the outer peipheral surface of projecting portion c may be overhanged inclined surface Cd which is inclined upwardly. In this case, the mold register surface (parting line PL) of upper and lower metal molds 15, 15 is located at the upper surface of projecting portion c, and gear portion 11$c$ hangs on the upper surface of projecting portion c. Such overlap is not limited to the upper surface but may be formed at both upper and lower surfaces of projecting portion c, as shown in FIGS. 13(A) and 13(D).

Figure 14:
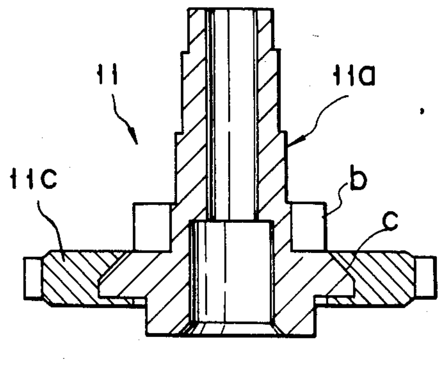
FIG. 14 is a view showing still another modification of the center wheel in the second embodiment.
Figure 15:
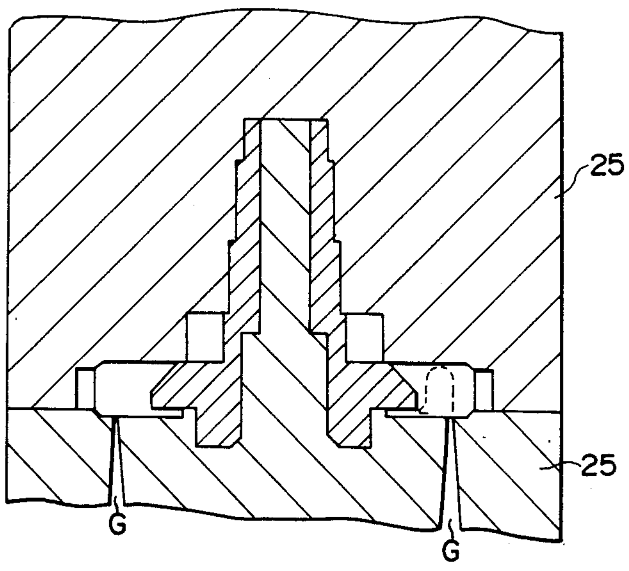
FIG. 15 is a view showing a method of manufacturing the center wheel shown in FIG. 14.

As shown in FIG. 14, the outer peripheral surface of projecting portion c may be formed to a downwardly inclined surface with the radially distal end being vertically cut off. In this case, as shown in FIG. 15, since the radially distal end of the downwardly inclined surface of projecting portion c is vertically cut off, projecting portion c cannot be deformed by the flow of a resin injected from resin injection gates G and rebounded on the inner surface of the metal molds 25, 25 toward the radially distal end of projecting portion c.

Figure 16:
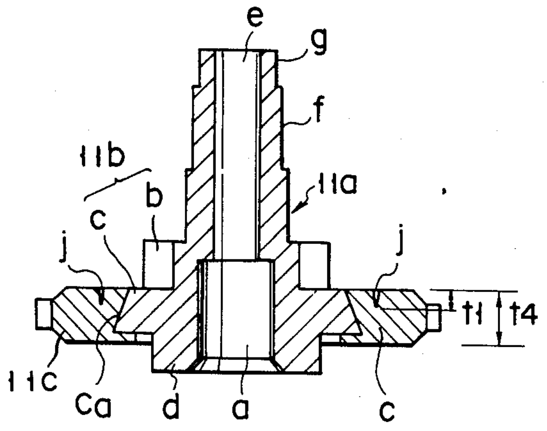
FIG. 16 is a longitudinal sectional view of a center wheel comprising a slip structure according to a third embodiment of the present invention.

A third embodiment of the present invention will be described with reference to FIGS. 16 to 18.

In this embodiment, gear portion 11$c$ is molded to have a recess j circled around the (rotational) axis of gear portion 11$c$ on its upper surface. If gear portion 11$c$ does not have such recess, when gear portion 11$c$ is molded on shaft portion 11$a$ which has been molded as a primary molded production, the high-temperature resin for gear portion 11$c$ injected through resin injection gates G is flowed with its temperature keeping high onto the slip surface (inclined outer peripheral surface) of shaft portion 11$a$ and is fused to the slip surface so that a slip torque between shaft and gear portions 11$a$ and 11$c$ is increased.

Circularly extended small projection 27$a$ for making such circular recess j in the upper surface of gear portion 11$c$ is formed in an area on the inner surface of molds 27, that area facing the inner opening of resin injection gates G, and is located nearer to the longitudinal axis of shaft portion 11$a$ than the inner opening of resin injection gates G, as shown in FIG. 17 (B). The circular extended small projection j hunges the flow of high-temperature resin injected through resin injection gates G into molds 27, 27 to mold gear portion 11$c$. Circular extended recess j has a V-shape in section the depth t3 of which is about ⅓ thickness t4 of gear portion 11$c$.

Figure 17A:
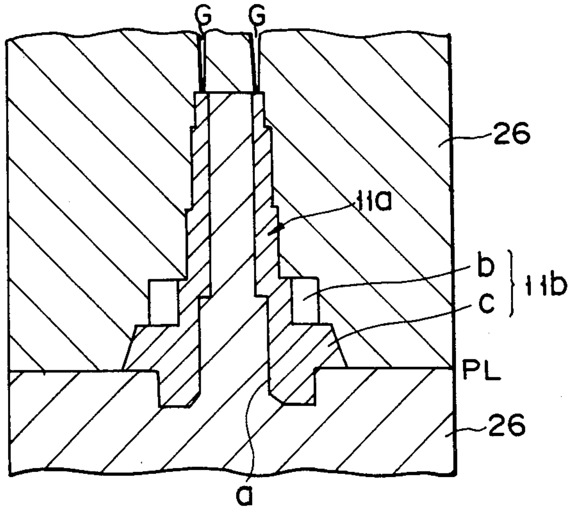
FIGS. 17(A) and 17(B) are views showing a method of manufacturing the center wheel of the third embodiment.
Figure 17B:
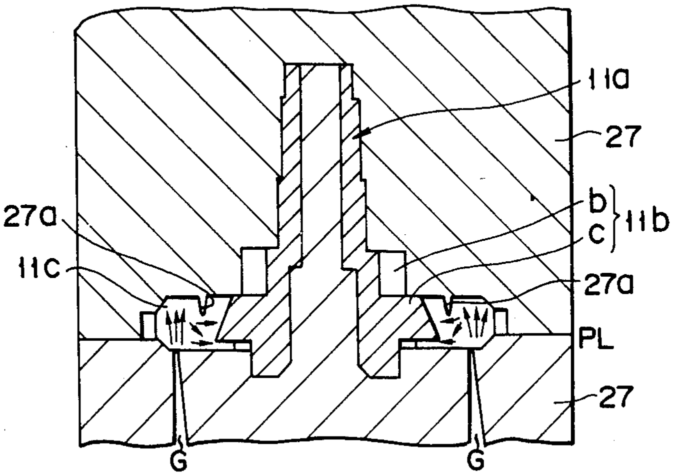

When the center wheel 11 described above is to be molded, shaft portion 11$a$ is formed by injection-molding by using metal molds 26 for a primary molding shown in FIG. 17(A). Shaft portion 11$a$ molded in this manner is removed from metal molds 26, 26 and thereafter is placed in upper and lower metal molds 27, 27 for secondary molding, shown in FIG. 17(B). Then, a synthetic resin is injected through resin injection gates G formed in lower metal mold 27, thereby forming gear portion 11$c$ on projecting portion c of shaft portion 11$a$ as a primary molded production. In this case, resin injection gates G open on the inner surface of lower mold 27 and at a position near to the outer peripheral edge of the inner surface, and circular extended projection 27$a$ having a V-shape in section for forming circular extended recess j having a V-shape in section projects from the inner upper surface of upper metal mold 27 into the cavity. For this reason, when a high-temperature resin is injected into the cavity from resin injection gates G to mold gear portion 11$c$, the resin is not directly flowed toward projecting portion c of canon pinion portion 11$b$ due to circular extended projection 27$a$ for forming recess j formed on the surface opposite to the inner openings of gates G, and is changed a direction of flow toward gates G. As a result, the time required for that the injected high-temperature resin reaches the radially distal end of projecting portion c is prolonged, and an amount of heat of the injected high-temperature resin is decreased due to flow resistance. Thus, since a resin temperature is decreased to some extent, the resin cannot fused on the radially distal end of projecting portion c.

Figure 18A:
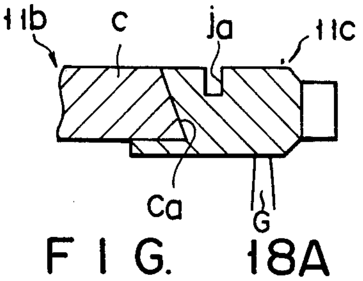
FIGS. 18(A) to 18(G) are views showing modifications of a center wheel in the third embodiment.
Figure 18E:
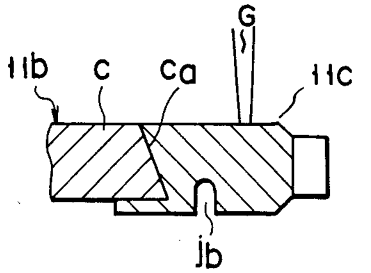
Figure 18B:
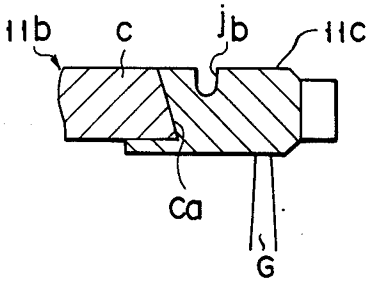
Figure 18F:
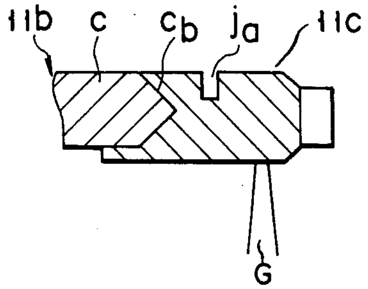
Figure 18C:
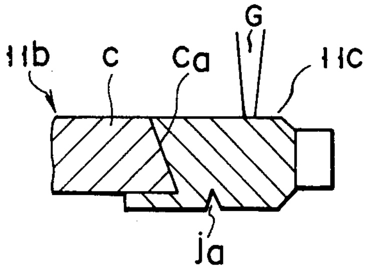
Figure 18D:
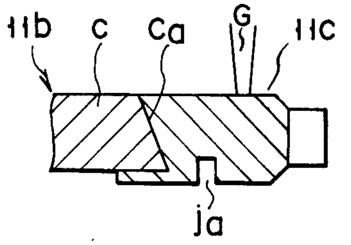
Figure 18G:
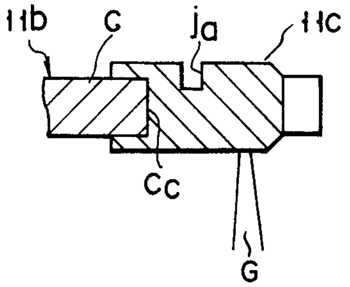

Note that in the above embodiment, circular extended recess j having a V-shape in section is formed in gear portion 11$c$. However, the present invention is not limited to this. For example, as shown in FIGS. 18(A) and 18(B), circular extended recess j may be recess ja having a rectangular section and recess jb having a U-shaped section. That is, recess j can have any shape in section if it can change the flow direction of the injected high-temperature resin. Recess j need not always be formed on the upper surface of gear portion 11$c$. For example, as shown in FIGS. 18(C) to 18(E), if resin injection gates G are opened on the upper inner surface of upper mold 27, recess j, ja, or jb having V-shape, rectangular, or U-shape in section may be formed on the lower inner surface of gear portion 11$c$. Furthermore, in the above embodiment, the outer peripheral surface of projecting portion c formed on canon pinion portion 11$b$ of shaft portion 11$a$ is formed as an inclined surface Ca. However, the present invention is not limited to this. For example, as shown in FIGS. 18(F) and 18(G), the outer peripheral surface of projecting portion c may be formed as a V shaped surface Cb or vertical flat surface Cc. Overlapping of gear portion 11$c$ over projecting portion c is not limited to the upper surface of projecting portion c but may be on both the upper and lower surfaces thereof.

Figure 19:
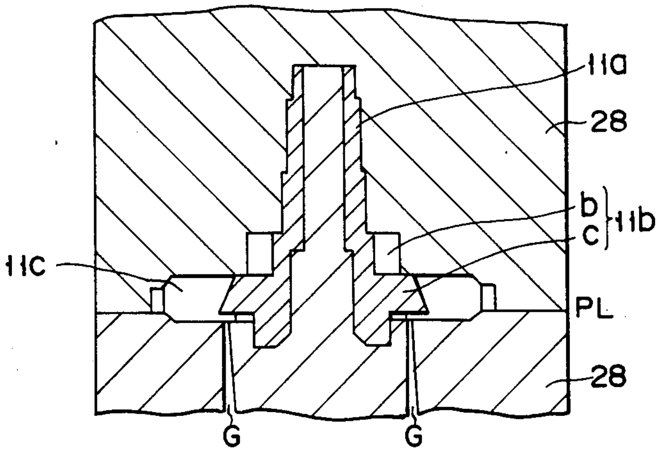
FIG. 19 is a view showing a method of manufacturing a center wheel according to a fourth embodiment of the present invention.

A fourth embodiment of the present invention will be described with reference to FIGS. 19 to 21.

The object of this embodiment is to prevent a high-temperature molten resin, flowed into the metal molds for a secondary molding so as to mold gear portion 11*c* on shaft portion 11*a* which has been molded and contained in the metal molds for a secondary molding, from fusing onto the slip surface of shaft portion 11*a* as a primary molded production, and thereby a slip torque between shaft and gear portions 11*a* and 11*c* to be prevented from increasing. In order to achieve this object, in this embodiment, the inner openings of the resin injection gates G for gear portion 11*c* faces the lower surface of projecting portion c of shaft portion 11*a*, which have been contained in the metal molds for a secondary molding.

Figure 20:
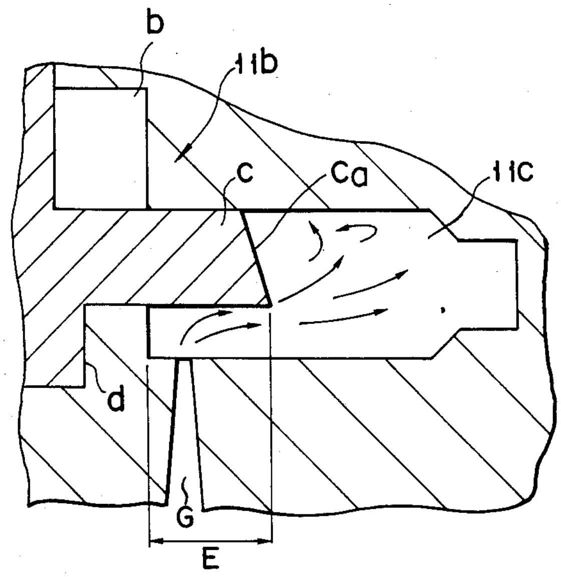
FIG. 20 is a view for explaining the method of manufacturing the center wheel shown in FIG. 19.

More specifically, as shown in FIG. 20, the inner openings of resin injection gates G are opened on the inner surface of lower secondary metal mold 28 to face the lower surface of projecting portion c of shaft portion 11*a*, which have been molded in the primary molds and transferred into the secondary moldings 28, 28. Therefore, during molding of gear portion 11*c*, a high-temperature resin injected through resin injection gates G is brought into contact with the lower surface of projecting portion c. Thus, the resin is not directly flowed toward the outer peripheral surface of projecting portion c, and the flow is directed toward the tooth end side of gear portion 11*c*. After the resin has reached the tooth end, it can be reversed toward the outer peripheral surface of projecting portion c. For this reason, the time required for that the injected high-temperature resin reaches the outer peripheral surface of projecting portion c is prolonged, and an amount of heat of the injected high-temperature resin is decreased due to flow resistance to decrease a resin temperature. Thus, the resin is prevented from being fused onto the outer peripheral surface, in particular, inclined surface Ca, of projecting portion c. Thus, very good rotation characteristic can be obtained, and an appropriate, stable slip torque can be obtained.

Figure 21A:
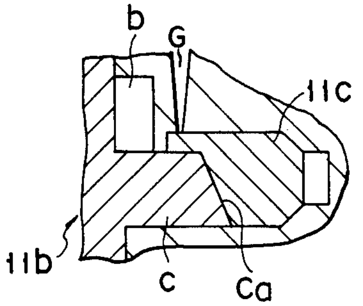
FIGS. 21(A) to 21(E) are views showing modifications of the center wheel in the fourth embodiment.
Figure 21B:
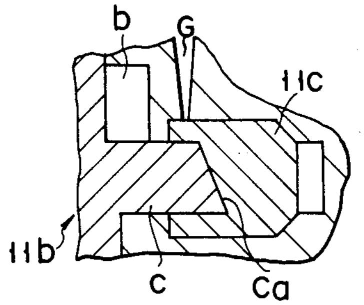
Figure 21C:
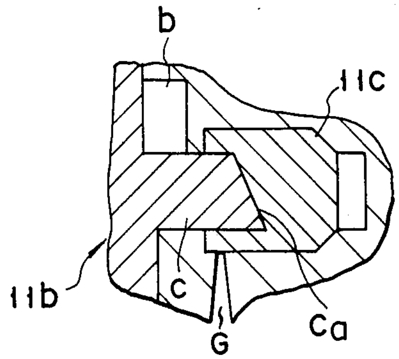
Figure 21D:
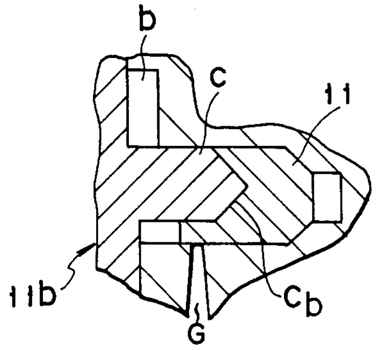
Figure 21E:
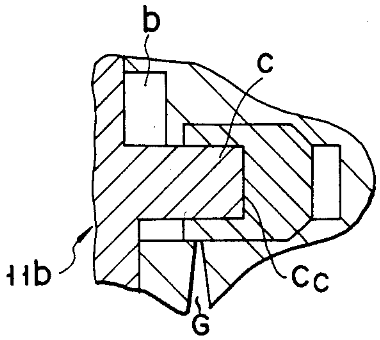

Note that in the above embodiment, resin injection gates G opens on the inner surface of the lower metal mold 28 for gear portion 11*c* so as to force the lower surface of projecting portion c of shaft portion 11*a* which have been molded in the primary molds and transferred into the secondary molds 28, 28. However, the present invention is not limited to this. For example, as shown in FIGS. 21(A) and 21(B), gates G may be opened on the inner surface of the upper metal mold 28 to face the upper surface of projecting portion c of shaft portion 11*a* as far as the gear portion 11*c* overlaps the upper surface of projecting portion c or both the upper and lower surfaces thereof. In particular, if gear portion c overlaps both the upper and lower surfaces of projecting portion c, gates G may be opened on the inner surface of the lower metal mold 28 to face the lower surface of projecting portion c, as shown in FIG. 21(C). In the above embodiment, the outer peripheral surface of projecting portion c formed on shaft portion 11*a* is formed as an inclined surface Ca. However, the present invention is not limited to this. As shown in FIGS. 21(D) and 21(E), projecting portion c may have V shaped outer peripheral surface Cb or vertically flatted outer peripheral surface Cc.

Figure 22:
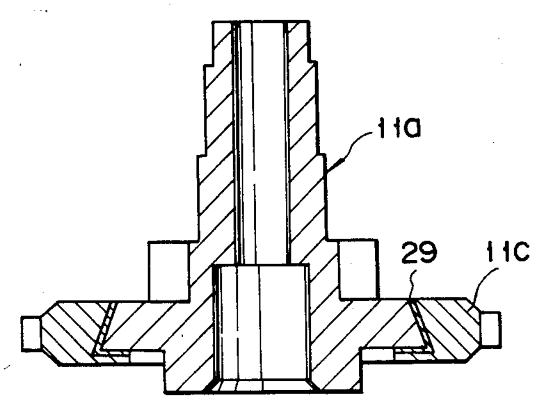
FIG. 22 is a view showing a center wheel according to a fifth embodiment of the present invention.
Figure 23:
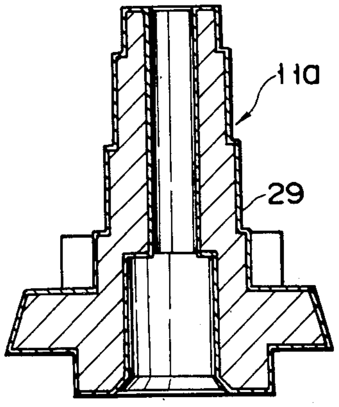
FIGS. 23 and 24 are views showing a method of manufacturing the center wheel shown in FIG. 22.
Figure 24:
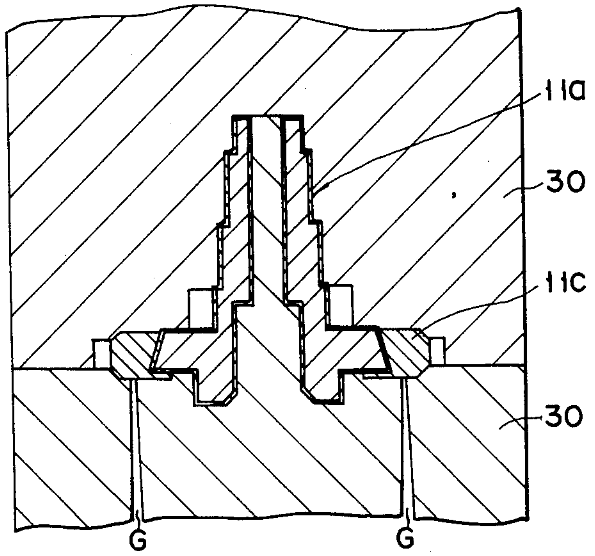

A fifth embodiment of the present invention will be described with reference to FIGS. 22 to 24.

In this embodiment, in order to reduce a slip torque, a fluorine-based resin film having a low friction coefficient is interposed between shaft and gear portions 11*a* and 11*c* in place of a technique wherein shaft and gear portions 11*a* and 11*c* are molded of oil-containing resin pellets or are subjected oil annealing as in the above embodiments.

More specifically, in the fifth embodiment, at first, shaft portion 11*a* is molded of a resin which does not contain oil. Then, a coating liquid prepared by mixing polytetrafluoroethylene in a solvent is applied to the outer peripheral surface of shaft portion 11*a* by dipping or spraying. An excess coating liquid is centrifuged to obtain a uniform film thickness. Then, the coating liquid is dried to form fluorine-based resin film 29 on the outer peripheral surface of shaft portion 11*a*. Thereafter, shaft portion 11*a* is placed in upper and lower secondary metal molds 30, 30. A resin for secondary molding is injected from resin injection gates G provided in lower metal mold 30 so as to mold gear portion 11*c* on the fluorine-based resin film 29 formed on shaft portion 11*a* as a primary molded production.

The center wheel 11 formed as described above is washed to remove fluorine-based resin film 29 excluding that on the contacting surfaces between projecting portion c of shaft portion 11*a* and gear portion 11*c*.

In the fifth embodiment, since shaft and gear portions 11*a* and 11*c* are combined each other with fluorine-based resin film 29 having a low friction coefficient being interposed therebetween, the contacting surfaces can be readily slipped, and the slip torque can be reduced and stabilized.

In the fifth embodiment, fluorine-based resin film 29 is coated on shaft portion 11*a*. When gear portion 11*c* is molded before molding of shaft portion 11*a*, fluorine-based resin film 29 may be coated on gear portion 11*c*.

As a fluorine-based resin, a fluorinated ethylene propylene resin may be used.

In the fifth embodiment, in order to further reduce the slip torque, a technique for molding one or both of shaft and gear portions 11*a* and 11*c* by using an oil-containing resin or a technique for annealing one or both of shaft and gear portions 11*a* and 11*c* in a high-temperature oil may be additionally employed.

In the first to fifth embodiments, the slip structure of the present invention is applied to the center wheel. However, the present invention can be applied to other wheels such as a third wheel. The present invention is not limited to a wristwatch, but can be applied to other analog timepieces, such as an analog timer, an analog stopwatch, and the like.

What is claimed is:

1. A slip structure of a timepiece comprising a synthetic resin shaft portion, and a synthetic resin gear portion which is molded on said synthetic resin shaft portion to be capable of slipping, in which during a normal timepiece operation, said shaft and gear portions are integrally rotated, and during a hand setting operation, only said shaft portion is rotated, wherein at least one of said shaft and gear portions is formed of an oil-containing resin material.

2. A structure according to claim 1, wherein an oil contained in said resin material is a silicone-based oil.

3. A structure according to claim 1, wherein both said shaft and gear portions are formed of said oil-containing resin material.

4. A structure according to claim 1, wherein said shaft portion is a minute hand shaft on which a minute hand is fitted.

5. A structure according to claim 1, wherein said shaft portion is a shaft for a third wheel.

6. A structure according to claim 1, wherein said shaft portion is molded at first, and, then, said gear portion is molded on said shaft portion.

7. A structure according to claim 1, wherein said gear portion is molded at first, and, then, said shaft portion is molded on said gear portion.

8. A structure according to claim 1, wherein a projecting portion is formed on said shaft portion, and said gear portion is molded on said projecting portion to be joined to said projecting portion.

9. A structure according to claim 8, wherein one of upper and lower surfaces of said projecting portion of said shaft portion serves as a register surface or parting line for upper and lower metal molds for molding said shaft portion.

10. A structure according to claim 1, wherein a groove is formed in one side surface of said gear portion to extend in a circumferential direction, a resin injection gate for said gear portion is located at an opposing side surface of said gear portion and outside said groove.

11. A structure according to claim 1, wherein a resin injection gate for said gear portion is formed to face an upper or lower surface of said projecting portion.

12. A structure according to claim 1, wherein said shaft portion is formed of a polyphenylene sulfide resin, and said gear portion is formed of a polyamide resin.

13. A structure according to claim 1, wherein said shaft portion is formed ofa polyetherimide resin, and said gear portion is formed of a polyamide resin.

14. A structure according to claim 1, wherein at least one of said shaft and gear portions is annealed in a high-temperature oil.

15. A slip structure of a timepiece comprising
a synthetic resin shaft portion, and
a synthetic resin gear portion which is molded on said synthetic resin shaft portion to be capable of slipping, in which
during a normal timepiece operation, said shaft and gear portions are integrally rotated, and during a hand setting operation, only said shaft portion is rotated, wherein
at least one of said shaft and gear portions is annealed in a high-temperature oil.

16. A structure according to claim 15, wherein both said shaft and gear portions are annealed in the high-temperature oil.

17. A structure according to claim 15, wherein said shaft portion is a minute hand shaft on which a minute hand is fitted.

18. A structure according to claim 15, wherein said shaft portion is a shaft for a third wheel.

19. A structure according to claim 15, wherein said shaft portion is molded at first, and, then, said gear portion is molded on said shaft portion.

20. A structure according to claim 15, wherein said gear portion is molded at first, and, then, said shaft portion is molded on said gear portion.

21. A structure according to claim 15, wherein a projecting portion is formed on said shaft portion, and said gear portion is mounted on said projecting portion to be joined to said projecting portion.

22. A structure according to claim 21, wherein one of upper and lower surfaces of said projecting portion of said shaft portion serves as a register surface or parting line for upper and lower metal molds for molding said shaft portion.

23. A structure according to claim 15, wherein a groove is formed in one side surface of said gear portion to extend in a circumferential direction, a resin injection gate for said gear portion is located at an opposing side surface of said gear portion and outside said groove.

24. A structure according to claim 15, wherein a resin injection gate for said gear portion is formed to face an upper or lower surface of said projecting portion.

25. A structure according to claim 15, wherein said shaft portion is formed of a polyphenylene sulfide resin, and said gear portion is formed of a polyamide resin.

26. A structure according to claim 15, wherein said shaft portion is formed of a polyetherimide resin, and said gear portion is formed of a polyamide resin.

27. A slip wheel structure of a timepiece comprising
a synthetic resin shaft portion, and
a synthetic resin gear portion which is molded on said synthetic resin shaft portion to be capable of slipping, in which
during a normal timepiece operation, said shaft and gear portions are integrally rotated, and during a hand setting operation, only said shaft portion is rotated, wherein
a fluorine-based resin film is interposed between a contact surface of said shaft and gear portions.

28. A structure according to claim 27, wherein said fluorine-based resin film is a polytetrafluoroethylene resin.

29. A structure according to claim 27, wherein said fluorine-based resin film is a fluorinated ethylene propylene resin.

30. A structure according to claim 27, wherein at least one of said shaft and gear portions is formed of an oil-containing resin material.

31. A structure according to claim 27, wherein at least one of said shaft and gear portions is annealed in a high-temperature oil.

32. A structure according to claim 27, wherein said shaft portion is a minute hand shaft on which a minute hand is fitted.

33. A structure according to claim 27, wherein said shaft portion is a shaft for a third wheel.

34. A structure according to claim 27, wherein said shaft portion is molded at first, and, then, said gear portion is molded on said shaft portion.

35. A structure according to claim 27, wherein said gear portion is molded at first, and, then, said shaft portion is molded on said gear portion.

36. A structure according to claim 27, wherein a projecting portion is formed on said shaft portion, and said gear portion is molded on said projecting portion to be joined to said projecting portion.

37. A structure according to claim 36, wherein one of upper and lower surfaces of said projecting portion of said shaft portion serves as a register surface or parting line for upper and lower metal molds for molding said shaft portion.

38. A structure according to claim 27, wherein a groove is formed in one side surface of said gear portion to extend in a circumferential direction, and a resin injection gate for said gear portion is located at an opposing side surface of said gear portion and outside said groove.

39. A structure according to claim 27, wherein a resin injection gate for said gear portion is formed to face an upper or lower surface of said projecting portion.

40. A structure according to claim 27, wherein said shaft portion is formed of a polyphenylene sulfide resin, and said gear portion is formed of a polyamide resin.

41. A structure according to claim 27, wherein said shaft portion is formed of a polyetherimide resin, and said gear portion is formed of a polyamide resin.

42. A structure according to claim 27, wherein at least one of said shaft and gear portions is formed of an oil-containing resin, and at least one of said shaft and gear portions is annealed in a high-temperature oil.

* * * * *